July 31, 1962 V. J. HOLOPAINEN 3,047,109
COUPLING

Filed Jan. 20, 1959 2 Sheets-Sheet 1

INVENTOR.
Vaino J. Holopainen
BY
Attorney

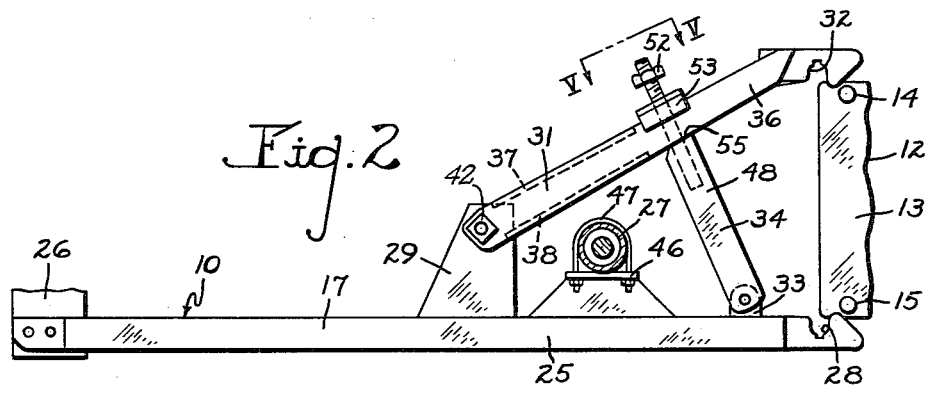
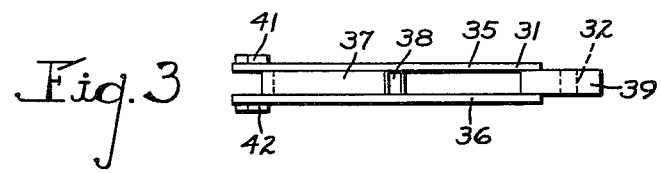
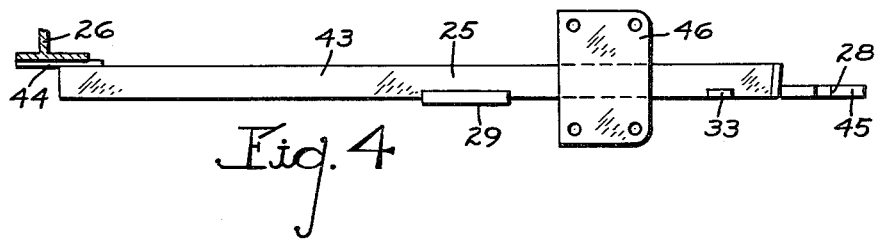
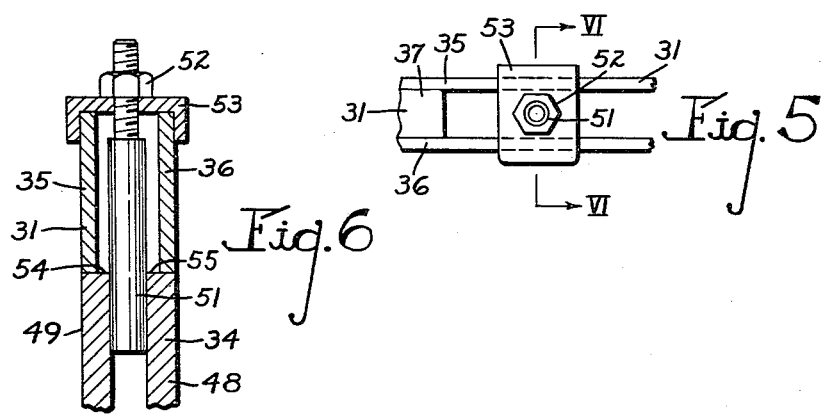
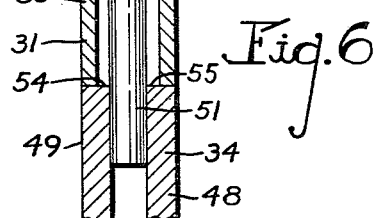
INVENTOR.
Vaino J. Holopainen

United States Patent Office 3,047,109
Patented July 31, 1962

3,047,109
COUPLING
Vaino J. Holopainen, Rutland, Mass., assignor to Wain-Roy Corporation, Hubbardston, Mass., a corporation of Massachusetts
Filed Jan. 20, 1959, Ser. No. 787,962
8 Claims. (Cl. 189—36)

This invention relates to a coupling and more particularly to apparatus for quickly connecting or disconnecting an attachment to a tractor, or the like.

It is common practice to make use of a basic traction unit to provide motive power and hydraulic pressure for a considerable number of implements. For this purpose, it is common practice to provide a connection between the tractor and the implement. A number of schemes have been used for accomplishing this coupling function, but many difficulties have been experienced. The couplings which have been provided for attaching light attachments, although they work quickly, are not capable of providing for heavy attachments of the type where the atttachment has a weight in the order of the weight of the tractor. On othe other hand, various connection means will handle heavy duty equipment attachments permit detachment from the tractor only with difficulty. Furthermore, heavy duty couplings in the past have been very expensive and sometimes are too complicated and difficult to maintain to be practical in earth-working or agricultural work. It will be readily understood that an intricate mechanism becomes quickly inoperative when subjected to the action of dirt, sand, and the like. Furthermore, the previously-known devices have been constructed with separable parts that are easily lost. These and other difficulties experienced with the prior art devices have been obviated in a novel manner by the present invention.

It is, therefore, an outstanding object of this invention to provide a coupling for connecting an attachment to a tractor, or the like.

Another object of the present invention is the provision of a heavy duty coupling which is simple and inexpensive to manufacture.

A further object of the invention is the provision of a coupling of simple construction which will require the minimum of maintenance and yet will be capable of a long life of useful service under very difficult conditions.

A still further object of the present invention is the provision of a coupling which is particularly useful in connecting to a tractor an attachment of the self-supporting type.

Another object of this invention is the provision of a coupling having no loose pins, nuts, or other parts which can be easily lost.

It is a further object of the invention to provide a coupling which may be used in a tractor to supplement the usual agricultural quick disconnect and, yet, will not interfere with the use of such conventional equipment.

Although the novel features which are believed to be characteristic of this invention will be particularly pointed out in the claims appended hereto, the invention itself, as to its objects and advantages, the mode of its operation and the manner of its organization may be better understood by reference to the annexed drawings in which:

FIG. 2 is a side elevational view of the apparatus;

FIG. 3 is a plan view of a portion of the apparatus;

FIG. 4 is a plan view of a portion of the apparatus;

FIG. 5 is a view of the apparatus, somewhat enlarged, taken on the line V—V of FIG. 2; and FIG. 6 is a sectional view taken on the line VI—VI of FIG. 5.

Figure 1:
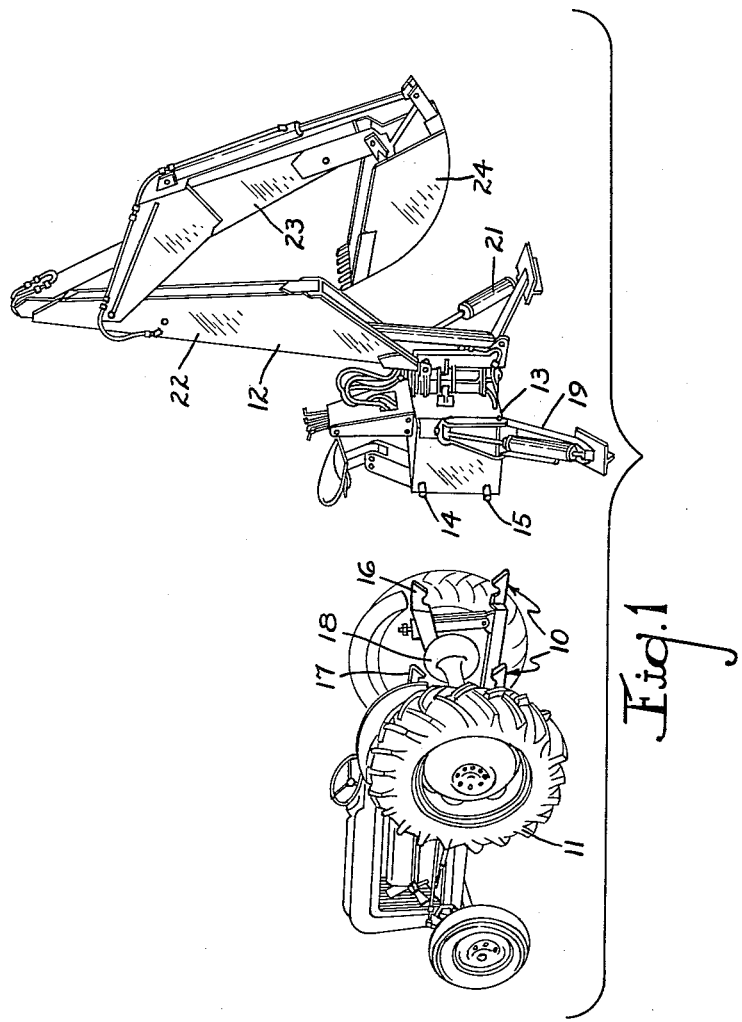
FIG. 1 is a perspective view of the apparatus embodying the principles of the present invention.

Referring first to FIG. 1, wherein are best shown the general features of the invention, the coupling, indicated generally by the reference numeral 10, is shown in use in joining a tractor 11 to an attachment 12. The attachment 12 is shown as consisting of a hydraulically-actuated backhoe which is the subject matter of the patent application of Holopainen Serial Number 651,229, filed April 8, 1957, now abandoned. A portion of the attachment is a box-like housing 13 from the forward edge of which extend pins 14 and 15. These pins extend horizontally and laterally from the box 13 at the forward portion thereof and it will be understood that a similar set of pins extends from the other side of the box. The coupling 10 consists of a right hand portion 16 and a left hand portion 17 connected to the opposite sides of the tractor on either side of the differential housing 18. The attachment 12 is provided with hydraulically actuated stabilizers 19 and 21 pivotally attached to the housing 13. Also attached to the housing 13 is a boom 22 which is capable of swinging in a vertical plane and in a horizontal plane under hydraulic actuation. Pivoted to the boom 22 is a dipper stick 23 which is hydraulically actuated for a pivotal movement relative to the boom. At the other end of the dipper stick is pivotally attached a shovel 24 which is also hydraulically actuated for a pivotal movement relative to the dipper stick 23. As shown in the drawings the attachment 12 has been separated from the tractor 11 and is supported on the three legs provided by the stabilizer 19, the stabilizer 21 and the shovel 24; it is thus self-supporting.

Referring now to FIG. 2, which shows the left hand portion 17 of the coupling 10, it can be seen that an elongated base member 25 is connected at one end to a structural member 26 forming part of the chassis of the tractor 11. The base member 25 is also connected in its intermediate portion to the axle housing 27 of the tractor 11. At the end opposite the said one end the base member 25 is formed with a notch 28 adapted to engage the pin 15 extending from the housing 13 of the attachment 12. Extending from the base member 25 somewhat forwardly of the point of attachment to the axle 27 is an abutment 29, having pivotally attached to its upper end an upper link 31 having at its other end a notch 32 adapted to engage a pin 14 on the housing 13 of the attachment 12. Somewhat forwardly of the notch 28 the base member 25 is provided with a small abutment 33 to which is pivotally attached a locking link 34.

As is evident in FIG. 3, the upper link 31 is provided with two spaced side members 35 and 36 which are held in place by web members 37 and 38. The notch 32 is formed in a solid slab 39 welded between the side members 35 and 36 at the upper end. At the lower end the side members 35 and 36 are supplemented by pads 41 and 42 through which a bore passes which receives the pin by which the link is pivotally attached to the abutment 29.

Referring now to FIG. 4, which best shows the details of the base member 25, it will be seen that most of the length of the member is formed by a box-like channel portion 43, at the forward end of which is welded a pad 44 intended for attachment to the structural member 26 of the tractor. At the other end is provided a solid slab 45 in which is formed a notch 28; this slab is welded to the end of the channel portion 43. The abutment 29 is suitably welded to the channel portion 43 of the base member as is the aboutment 33. Between these two abutments is arranged a raised platform or saddle 46 having apertures to receive U-bolts 47 for embracing the axle housing 27 of the tractor.

The locking link 34 consists of a pair of side members 48 and 49 which embrace the abutment 33 and are pivotally attached thereto and have camming surfaces 54 and 55 at their upper ends for engagement with the lower edges of the side members 35 and 36. Welded between the side members and extending longitudinally thereof is a stud 51 which is threaded at its upper end and is provided with a nut 52. The stud 51 extends between the side members 35 and 36 of the upper link 31. A channel-like washer 53 is provided below the nut 52 and has downwardly extending flanges which embrace the upper edges of the side members 35 and 36 of the upper link. This construction is particularly evident in FIGS. 5 and 6.

The operations of the invention will now be readily understood in view of the above description.

Assuming that the coupling 10, the tractor 11, and the attachment 12 are in the condition shown in FIG. 1, that is to say, in disconnected condition, the operator backs the tractor toward the attachment until the notches 28 and 32 have the relationship to the pins 14 and 15, respectively, that is shown in FIG. 2. He then backs the tractor slightly in the same direction until the notches lie directly in line with the pins. The pins will usually fall into place within the notches. If the attachment is in such a position so that the pin 15 is somewhat above the notch 28, oil is released from the stabilizers to lower the attachment until the pin 15 rests in the notch 28. Since the nut 52 is raised well above its washer 53, the upper link 31 is free to pivot in a vertical plane. If the notch 32 is somewhat below the point where the end of the link 31 will clear the pin 14, the inclined surface of the arm will cause it to rise up until the arm clears the pin and then it will fall downwardly until the notch 32 embraces the pin. In the same way, if the pin 15 is somewhat below the uppermost level of the base member 17, it will cam up on the inclined surface of the base member and then drop into the notch 28. When the pins 14 and 15 reside snugly within the notches 32 and 28, repectively, the locking arm 34 is pivoted until it lies at a right angle to the upper link 31. Then the nut 52 is turned downwardly until the housing 13 is securely clamped between the base member 25 and the upper link 31. The attachment is now securely attached to the tractor and may be used in the usual way. When it is desired to remove the attachment, the stabilizers 19 and 21 and the shovel 24 are pressed downwardly into the earth so that the attachment is self-supporting and most of the weight of the attachment has been removed from the points of contact of the pins 14 and 15 with the notches 32 and 28. Then, the nut 52 is turned by use of a wrench or the like until it is well above the washer 53. A forward movement of the tractor will now move the pins 14 and 15 out of their notches.

It can be seen, then, that the present coupling is very simple in construction and will not readily get into trouble because of dirt or the like; furthermore, it is a coupling that has no parts which may be readily lost and only an ordinary wrench is necessary to make the disconnection. Also, the connection is such as to permit carrying rather large weights whose center of gravity may be far removed from the pins 14 and 15; this latter situation would exist when the boom 22 and dipper stick 23 are raised up in the air and the stabilizers 19 and 21 are raised, as would usually be the case when the tractor is transporting the attachment from one place to another.

While certain novel features of the invention have been shown and described and are pointed out in the annexed claims, it will be understood that various omissions, substitutions and changes in the forms and details of the device illustrated and in its operation may be made by those skilled in the art without departing from the spirit of the invention.

The invention having been thus described, what is claimed as new and desired to secure by Letters Patent, is:

1. A quick-release coupling for use in connecting an attachment to a tractor or the like, comprising an elongated base member adapted to be fixed to the chassis of the tractor, an elongated upper link pivotally connected at one end to the base member, an elongated locking link pivotally connected to the base member at a point spaced from the point of connection of the upper link thereto, the upper link having spaced side members and the locking link extending between the said side members, the locking link being swingable between the side members longitudinally of the upper link, the base member having an upwardly-facing notch at one end thereof and the upper link having a similar notch formed in the end thereof opposite the end which is connected to the base member, the notches facing one another on a generally vertical line, the base member being attached at the end opposite the notch to the chassis tractor and having a saddle in the intermediate portion for attachment to the axle housing of the tractor, and means associated with the locking link to cause the locking link to engage the intermediate portion of the upper link to cause the upper link to swing downwardly to bring the said notches closer together.

2. A quick-release coupling for use in connecting an attachment to a tractor or the like, comprising an elongated base member adapted to be fixed to the chasis of the tractor, an elongated upper link pivotally connected to one end to the base member, an elongated locking link pivotally connected to the base member at a point spaced from the point of connection of the upper link thereto, the locking link being swingable longitudinally of the upper link, the base member having an upwardly-facing notch at one end thereof and the upper link having a similar notch formed in the end thereof opposite the end which is connected to the base member, the notches facing one another on a generally vertical line, the base member being attached to the chassis of the tractor at the end which is opposite the notch and having a saddle in the intermediate portion thereof for attachment to the axle housing of the tractor, and means associated with the locking link to cause the locking link to engage the intermediate portion of the upper link to cause the upper link to swing downwardly to bring the said notches closer together, the said means consisting in the upper end of the locking link being formed as a threaded stud on which a washer and nut are passed, the washer being formed with downwardly-depending flanges to engage and slide along the upper edge of the upper link.

3. A quick-release coupling for use in connecting an attachment to a tractor or the like, comprising a base member adapted to be fixed to the tractor, an upper link pivotally connected at one end to the base member at an intermediate portion thereof, a locking link pivotally connected to the base member at a point spaced from the point of connection of the upper link thereto, the upper link having spaced side members and the locking link extending between the said side members, the locking link being swingable between the side members longitudinally of the upper link, the base member having an upwardly-facing notch at one end thereof and the upper link having a similar notch formed in the end thereof opposite the end which is connected to the base member, the notches facing one another on a generally vertical line, the base member being attached to the chassis of the tractor at the end which is opposite the notch and having a saddle in the intermediate portion thereof for attachment to the axle housing of the tractor, and screw means associated with the locking link to cause the locking link to engage the intermediate portion of the upper link to cause the upper link to swing downwardly to bring the said notches closer together, the said screw means consisting in the upper end of the locking link being formed as a threaded stud on which a washer and nut are passed, the washer being formed with downwardly-depending flanges to engage and slide along the upper edge of the upper link.

4. A quick-release coupling for use in connecting an attachment to a tractor or the like, comprising an elongated base member adapted to be fixed to the chassis of the tractor, an elongated upper link pivotally connected at one end to the base member at an intermediate portion thereof, an elongated locking link pivotally connected to the base member at a point spaced from the point of connection of the upper link thereto, the upper link having spaced side members and the locking link extending between the said side members, the locking link being swingable between the side members longitudinally of the upper link, the base member having an upwardly-facing notch at one end thereof and the upper link having a notch formed in the end thereof opposite the end which is connected to the base member, the notches facing one another on a generally vertical line, the base member being attached to the chassis of the tractor at the end opposite the notch and having a saddle in the intermediate portion for attachment to the axle housing of the tractor, and screw means associated with the locking link to cause the locking link to engage the intermediate portion of the upper link to cause the upper link to swing downwardly to bring the said notches closer together.

5. A quick-release coupling for use in connecting an attachment to a tractor or the like, comprising an elongated base member adapted to be fixed to the chassis of the tractor, an elongated upper link pivotally connected at one end to the base member at an intermediate portion thereof, an elongated locking link pivotally connected to the base member at a point spaced from the point of connection of the upper link thereto, the upper link having spaced side members and the locking link extending between the said side members, the locking link being swingable between the side members longitudinally of the upper link, the base member having an upwardly-facing notch at one end thereof and the upper link having a notch formed in the end thereof opposite the end which is connected to the base member, the notches facing one another on a generally vertical line, the base member being attached to the chassis of the tractor at the end opposite the notch and having a saddle in the intermediate portion for attachment to the axle housing of the tractor, and screw means associated with the locking link to cause the locking link to engage the intermediate portion of the upper link to cause the upper link to swing downwardly to bring the said notches closer together, the said screw means consisting in the upper end of the locking link being formed as a threaded stud on which a washer and nut are passed, the washer being formed with downwardly-depending flanges to engage and slide along the upper edge of the upper link.

6. A coupling in combination with an attachment for a vehicle, the attachment having a main body of substantial height and having oppositely-facing, generally vertical side surfaces, upper and lower pins extending laterally from the said side surfaces, the pins on each side being substantially separated in the vertical direction and lying in a substantially vertical line, base members adapted to be fixed one to each side of the vehicle, an upper link pivotally connected at one end to each of the base members, a locking link pivotally connected to each of the base members at a point spaced from the point of connection of the corresponding upper link, each base member having an upwardly-facing notch at one end thereof and each upper link having a similar notch formed in the end thereof opposite the end which is connected to the base member, the notches of each set of upper link and base member facing one another and adapted to engage a pair of the upper and lower pins on the corresponding side of the attachment, the locking links being engageable with the upper links and swingable lengthwise thereof to cause the upper links to swing upwardly and downwardly to move the said notches farther apart or closer together, respectively.

7. A quick-release coupling for use in connecting an attachment to a tractor or the like, comprising a base member adapted to be fixed to the tractor, an upper link pivotally connected at the end to the base member and having a downwardly-directed lower edge, a locking link pivotally connected to the base member at a point spaced from the point of connection of the upper link thereto, the locking member being swingable longitudinally of the upper link and having an upwardly-directed camming surface, the base member having an upwardly-facing notch at one end thereof and the upper link having a similar downwardly-facing notch formed in the end thereof opposite the end which is connected to the base member, the notches facing one another on a generally vertical line, and the camming surface of the locking link engaging the lower edge of the upper link to cause the upper link to swing upwardly to separate the said notches when the locking link is swung longitudinally of the upper link.

8. A quick-release coupling for use in connecting an attachment to a tractor or the like, comprising an elongated base member adapted to be fixed to the chassis of the tractor, an elongated upper link pivotally connected at one end to the base member at an intermediate portion thereof and having a downwardly-directed lower edge, an elongated locking link pivotally connected to the base member at a point spaced from the point of connection of the upper link thereto and having an upwardly-directed camming surface, the upper link having spaced side members and the locking link extending between the said side members, the locking link being swingable between the side members longitudinally of the upper link, the base member having an upwardly-facing notch at one end thereof and the upper link having a similar downwardly-directed notch formed in the end thereof opposite the end which is connected to the base member, the notches facing one another on a generally vertical line, the base member being attached to the chassis of the tractor at the end opposite the notch and having a saddle in the intermediate portion of attachment to the axle housing of the tractor, screw means associated with the locking link to cause the locking link to engage the intermediate portion of the upper link to cause the upper link to swing downwardly to bring the said notches closer together, the said screw means consisting in the upper end of the locking link being formed as a threaded stud on which a washer and nut are passed, the washer being formed with downwardly-depending flanges to engage and slide along the upper edge of the upper link, and the camming surface of the locking link engaging the lower edge of the upper link to cause the upper link to swing upwardly to separate the said notches when the locking link is swung longitudinally of the upper link.

References Cited in the file of this patent

UNITED STATES PATENTS

| | | |
|---|---|---|
| 2,243,347 | Klein | May 27, 1941 |
| 2,525,505 | Wiedman | Oct. 10, 1950 |
| 2,610,560 | Coultas et al. | Sept. 16, 1952 |